Sept. 29, 1942.
R. H. McKEE
2,297,062
SEPARATION OF OIL FROM GAS
Filed May 23, 1938
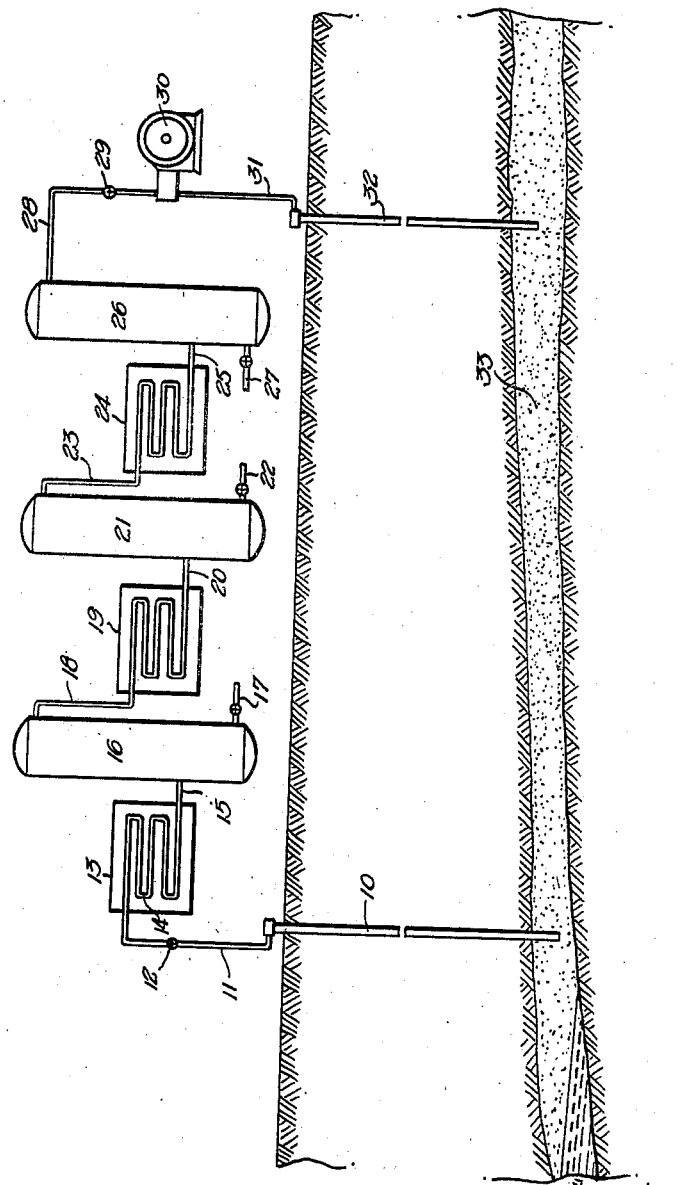
Inventor
RALPH H. McKEE
By C. L. Parker
Attorney Patented Sept. 29, 1942

2,297,062

UNITED STATES PATENT OFFICE 2,297,062

SEPARATION OF OIL FROM GAS

Ralph H. McKee, New York, N. Y.

Application May 23, 1938, Serial No. 209,633

2 Claims. (Cl. 62—175.5)

This invention relates to the separation of oil from gas, and more particularly to an improved method of separating the crude oil from the gas present in the one-phase mixture thereof produced from certain high pressure wells.

The principal object of this invention is to provide an improved method of treating a one-phase mixture of gas and oil to separate and recover the oil therefrom.

An important object of this invention is to provide an improved process of separating an oil from a gas in which the oil is dissolved in the gaseous phase.

A further object of this invention is to provide a method of separating the crude oil from the gas present in the one-phase mixture thereof produced from certain high pressure wells, without substantial reduction in the pressure at which said mixture is present in the well.

A further object of the present invention is to provide a new method of fractionating crude oil by means of chilling instead of heating as in the conventional prior methods of fractionation.

Other objects and advantages of my present invention will become apparent during the course of the following description.

As is well known, many oil wells produce crude oil and gas simultaneously, and the oil and gas are separately recovered by means of an oil and gas separator. In such cases, the mixture of oil and gas is produced at pressures substantially below, and generally very greatly below, 3,000 pounds per square inch. Such mixtures of gas and oil which are produced at pressures which are comparatively low in comparison with the pressures encountered in the practice of the present invention, can be satisfactorily treated in conventional oil and gas separators for the purpose of separating and recovering the oil present.

However, in certain oil fields, particularly where deep drilling is resorted to, gas and oil are simultaneously produced from the wells at such high pressures and temperatures that the gas and oil cannot be separated by the use of the usual oil and gas separator. For example, a number of the wells in the Gulf Coast area in Texas, which are in the neighborhood of 10,000 feet deep, simultaneously produce oil and gas under pressures of from 4,000 to 6,000 pounds per square inch. Other wells in the Cotton Valley field and the Lirette field in Louisiana have bottom pressures exceeding 5,000 pounds per square inch. In addition to being under these high pressures, the oil and gas are present in the pools in these fields at high temperatures, which normally vary from 160° to 260° F., the majority being at temperatures above 200° F.

When the oil and gas mixtures produced from these high pressure wells are passed through oil and gas separators in the usual way, it is found that no substantial separation of the oil from the gas is effected, and that the oil can be separated from the gas only by greatly reducing the pressure below that at which the oil and gas mixture is drawn off at the mouth of the well. Adequate separation of the oil from the gas can be effected in the usual oil and gas separators only by reducing the pressures to about 2,000 pounds per square inch, and preferably to a much lower pressure. However, this reduction in pressure is commercially disadvantageous in those fields where the gas is pumped back into the ground in order to maintain the pressure on the oil pool, since it involves substantial recompressing of the gas after the separation of the oil therefrom in order to pump the gas back into the ground.

In view of the great expense involved in the recompressing of the gas to its original pressure, or above, as hereinbefore referred to, the cost of producing oil from these high pressure wells is so excessive as to render these wells commercially impracticable. However, the only alternative which heretofore has been available by which the excessive production cost of the oil could be reduced was the discontinuance of the practice of recompressing the separated gas and returning it to the ground. The adoption of such an alternative, however, is economically unsound since, as is well known, the greatest production from a given pool is obtained only by pumping the gas back into the ground to maintain the pressure on such pool.

I have discovered a method by which the oil and gas mixtures from high pressure wells of the character referred to can be treated to recover the oil therefrom without reduction of the pressures at which the mixtures are drawn off at the mouth of the well, whereby the gas, after the separation of the oil therefrom, can be returned to the ground with a minimum of expense for recompression. In the practice of my method, the only compression required is essentially only that necessary to make up the loss of pressure due to the frictional and head loss due to the depth of the well.

Broadly speaking, the method forming the subject matter of the present invention involves the separation of an oil from a gas in which the oil is dissolved in a gaseous phase by lowering the temperature of the mixture below the saturation point of the solvent gas for the oil. I have found that the oil and gas which are simultaneously produced from the high pressure wells referred to are present in a one-phase mixture. In other words, the gas and oil are substantially in a single phase in the oil pool and also as they come out at the top of the well at approximately the temperature and pressure existing in the pool. The gas, which is predominantly hydrocarbon gas, ordinarily being 80 to 90% methane, is so concentrated due to the high pressure and temperature that, although a gas, it approaches liquid condition and acts in the nature of a solvent liquid to dissolve crude oil in the well, the whole mixture or solution being in gaseous phase. That such is the condition of the oil and gas mixture as it is produced from these wells is confirmed by the earlier work of Ralph H. McKee and H. H. Parker, which established that concentrated hydrocarbon gas, i. e. gas under a heavy pressure and above its critical temperature, is a solvent for petroleum products not normally volatile.

The fact that the oil in the high temperature and high pressure pools referred to is dissolved in the gaseous phase in the accompanying concentrated hydrocarbon gas explains why the oil can not be separated from the gaseous mixture in the usual oil and gas separators at the original pressure of the gaseous mixture. As will be apparent in the light of the foregoing explanation, and as has been found in practice, the oil can not be separated in the conventional apparatus until the pressures are very greatly reduced, whereby the concentration of the gas is so decreased that it no longer acts as a solvent liquid for the oil. Thus, by sufficiently lowering the pressure, the oil is caused to come out of solution, thereby permitting the oil to be separated from the gas in the conventional oil and gas separators. However, as stated, this reduction in pressure is attended with the commercial disadvantage that substantial recompression is required in order to pump the gas back into the ground.

In my present method I treat the one-phase mixture of oil and gas at the pressure at which it is delivered from the top of the well and separate the oil from the mixture without appreciable reduction in such pressure. I accomplish this by suitably lowering the temperature of the mixture below the saturation point of the solvent gas for the oil. This merely involves the passing of the gaseous mixture through a coil or tower arranged in a cooling tank, and drawing the separated oil off at the bottom of the coil or tower and discharging the gas from the outlet end of the coil or tower to a compressor which pumps the gas back into the ground.

If it is desired to recover the crude oil as such, and not as different fractions thereof, the gaseous mixture is chilled, as by means of solid carbon dioxide or a solution of solid carbon dioxide in a solvent, or otherwise, to a temperature in the neighborhood of −70° F. Of course, the extent of cooling required to lower the temperature of the mixture below the saturation point of the solvent gas for the oil will vary considerably, depending upon the type of oil present, the type of gas, and the pressure and temperature of the gaseous mixture treated. In some instances, chilling to as low a temperature as −70° F. may not be found necessary, whereas in other cases chilling to a somewhat lower temperature may be found desirable. In any event, in treating these particular gas mixtures, the lowest temperature employed should be kept well above −116.5° F., the critical temperature of methane, of which the gas present ordinarily largely consists.

Instead of separating and recovering the crude oil as such, in the manner described above, it will ordinarily be found preferable to subject the gaseous mixture under treatment to progressive cooling whereby the oil present in the gaseous mixture can be recovered in separate fractions. For example, by first chilling the mixture to a temperature just below the saturation point of the solvent gas for the large-molecule asphalt-like components, these can be first separated and drawn off. Thereafter, the remaining gaseous mixture can be chilled to a temperature just below the saturation point of the solvent gas for heavy oils, such as lubricating oil stock. Thereafter, by suitably lowering the temperature of the mixture still further, lighter oils, such as gas oil crude, can be separated. Thereafter, the temperature of the remaining gaseous mixture can be still further lowered, say to approximately −70° F., to separate the still lighter oils such as stock suitable, after refining in the customary manner, for producing burning oils and motor fuels without cracking. As will be apparent, this modification of the present invention provides a new method of fractionating crude oil in which the operation is carried out by chilling, rather than by distilling, i. e. heating, as in conventional methods heretofore practiced.

A simplified, diagrammatic illustration of one type of equipment suitable for use in the practice of the above described invention is shown in the accompanying drawing.

The gaseous phase oil and gas mixture to be treated is withdrawn from the well 10 by means of the pipe 11, which is provided with the valve 12, and delivered to the cooling tank 13. In the tank 13 the mixture passes through a series of return bends 14 which are surrounded with any suitable chilling medium maintained at the desired temperature. From the cooling tank 13, the mixture is delivered through the pipe 15 to the separating tower 16, which may be a conventional plate and cap tower, to separate the gaseous mixture from the liquid which has been condensed in the cooler 13. The condensed liquid collecting in the separating tower 16 is withdrawn therefrom through the valved pipe 17. The gaseous mixture discharged from the separating tower 16 is delivered through the pipe 18 to the cooling tank 19, where the gaseous mixture is further chilled to condense a further fraction or fractions of the oil in the gaseous mixture. The resulting mixture is delivered through the pipe 20 to a second separating tower 21, which may be similar in construction to the tower 16. The liquid condensed by the further cooling of the mixture in the cooling tank 19 is separated in the tower 21 and may be withdrawn therefrom by means of the valved pipe 22. The gaseous mixture discharged from the tower 21 is delivered through the pipe 23 to the cooling tank 24, in which a further fraction or fractions of the oil is condensed. The resulting mixture is discharged through the pipe 25 to the separating tower 26, the construction of which may be similar to that of the towers 16 and 21. The liquid condensed by the further cooling in the cooling tank 24 may be withdrawn from the tower 26 by means of the valved pipe 27. The gases discharged from the tower 26 are passed through the pipe 28, having a valve 29, to a compressor 30 which serves to pump the gas through the pipe 31 into the well 32 which extends into the oil and gas sands 33.

As will be apparent, the heaviest oil is condensed and separated in the tower 16 and progressively lighter oils are separated in the towers 21 and 26. As described above, the cooling media in the cooling tanks 13, 19 and 24 are maintained at progressively lower temperatures.

In the operation of the equipment, the valve 29 is first closed and the valve 12 is fully open. The valve 29 is then partially opened and the compressor 30 is started in operation. The compressor 30 merely has to furnish approximately the pressure lost in the operation, which is relatively slight due to the fact that there is no essential loss of pressure in the practice of the process.

The following example is illustrative of a specific embodiment of this modification of the process:

This example relates to the treatment of a typical oil and gas mixture in gaseous phase produced from a Texas well under a pressure of about 6,000 pounds per square inch and at a pool temperature in the neighborhood of 250° F. The gas present in the mixture is predominantly (i. e. 80–90%) methane and also contains some small amounts of ethane, propane and nitrogen. The oil present in the mixture, when separated by the ordinary method after reducing the pressure to substantially below 2,000 pounds per square inch, has a gravity of about 25° Bé. At the pressure and temperature at which the oil and gas mixture is present in the pool, a cubic inch of the gas carries up to about ½ cubic inch of oil dissolved therein, the gas and oil being substantially in a single gaseous phase, as stated.

The above described typical gas and oil mixture is progressively passed through a series of coils or towers arranged in separate cooling tanks and is progressively cooled in the successive coils or towers, the components separated out in the several coils or towers being drawn off at the bottom thereof. In the first cooling operation, the temperature of the mixture is lowered to around 50° F., which results in asphaltic and heavy oils being separated. In the next succeeding cooling operation, the mixture is then cooled to about 20° F., resulting in the separation of comparatively heavy oils, such as lubricating oil stock. The remaining mixture is then cooled to approximately 0° F., which results in the separation of an oil in the nature of gas oil crude. Thereafter, the remaining mixture is sharply cooled to a temperature of approximately —70° F., resulting in the separation of lighter oils such as stock suitable for making burning oils and motor fuels without cracking. These oils can be refined in the customary manner. The gas remaining after this final cooling consists largely of methane with some other hydrocarbon gases and a small amount of nitrogen present. This gas is delivered from the last coil or tower to a suitable compressor to be pumped back into the ground.

If desired, the number of cooling operations, as described above, can be advantageously reduced. For example, after the asphaltic and heavy oils have been separated by cooling the mixture to about 50° F., the temperature of the remaining mixture may be cooled directly to about 0° F., which results in the separation of an oil which is particularly useful as a stock for cracking purposes.

From the foregoing it will be apparent that I have provided a simple and effective method for separating an oil from a gas in which the oil is dissolved in the gaseous phase due to the concentration of the gas by high pressure, without lowering such pressure or with only partially lowering such pressure, e. g., to above about 3,000 pounds per square inch. Also, it will be apparent that I have provided a new method for fractionating crude oil which is particularly applicable where the crude oil is produced concurrently with gas under such conditions of temperature and pressure that the oil is dissolved in the gas in gaseous phase.

My process is particularly applicable to the treatment of oil and gas mixtures having a pressure above 3,000 pounds per square inch in the well, especially where the temperature in the well exceeds 200° F. Moreover, my process is applicable, under the conditions specified, where the gas present with the oil is predominantly a hydrocarbon gas, rather than a non-hydrocarbon gas, such as gas consisting largely of carbon dioxide, as in the case of certain Mexican wells.

While I have described in detail the preferred practice of my process, it is to be understood that the details of procedure may be variously modified without departing from the spirit of the invention or the scope of the subjoined claims.

I claim:

1. In a method of treating a mixture of petroleum and a gas, which is predominantly a hydrocarbon, which mixture is under a pressure in excess of 3,000 pounds per square inch and at a temperature in excess of 160° F., the improvement for separating the oil from said mixture without substantial reduction of said pressure which comprises lowering the temperature of said mixture to in the neighborhood of —70° F. to convert components of said oil from the gaseous phase to the liquid phase, and separating the resulting liquefied components from the accompanying gas.

2. The method of separating the oil from the gas in a mixture thereof produced from a high pressure well, which mixture is under pressure in excess of 3,000 pounds per square inch, at a temperature in excess of 160° F., and consists substantially of a single gaseous phase having oil dissolved therein, said mixture having the characteristic that it is separable on decrease of pressure into a liquid oil phase and a gaseous phase, which comprises progressively chilling the mixture to temperatures in the neighborhood of 50° F., 20° F., 0° F., and —70° F. to successively precipitate fractions of said oil in liquid phase, while maintaining the mixture at substantially the pressure at which the mixture is delivered at the top of the well, and successively separating and recovering the said fractions after the precipitation thereof in liquid form.

RALPH H. McKEE.